US012694891B2

(12) United States Patent     (10) Patent No.:    US 12,694,891 B2
Alisamir et al.                   (45) Date of Patent:         Jul. 28, 2026

(54) METHOD, DEVICE AND COMPUTER PROGRAM FOR EMOTION RECOGNITION FROM A REAL-TIME AUDIO SIGNAL

(71) Applicants: BULL SAS, Les Clayes-sous-Bois (FR); UNIVERSITE GRENOBLE ALPES, Saint Martin d'Heres (FR); INSTITUT POLYTECHNIQUE DE GRENOBLE, Grenoble (FR); CENTRE NATIONAL DE LA RECHERCHE SCIENTIFIQUE, Paris (FR)

(72) Inventors: Sina Alisamir, Saint Martin d'Heres (FR); Fabien Ringeval, Poisat (FR)

(73) Assignees: BULL SAS, Les Clayes-sous-Bois (FR); UNIVERSITE GRENOBLE ALPES, Saint Martin d'Heres (FR); INSTITUT POLYTECHNIQUE DE GRENOBLE, Grenoble (FR); CENTRE NATIONAL DE LA RECHERCHE SCIENTIFIQUE, Paris (FR)

( * ) Notice:  Subject to any disclaimer, the term of this patent is extended or adjusted under 35 U.S.C. 154(b) by 510 days.

(21) Appl. No.: 18/082,131

(22) Filed:  Dec. 15, 2022

(65)           Prior Publication Data

US 2023/0197106 A1       Jun. 22, 2023

(30)        Foreign Application Priority Data

Dec. 16, 2021     (EP) ..................................... 21306787

(51) Int. Cl.
   *G10L 15/06*        (2013.01)
   *G10L 15/08*        (2006.01)
            (Continued)

(52) U.S. Cl.
   CPC ............ *G10L 25/63* (2013.01); *G10L 15/063* (2013.01); *G10L 15/08* (2013.01); *G10L 15/22* (2013.01)

(58) Field of Classification Search
   CPC ........ G10L 25/63; G10L 15/063; G10L 15/08
   See application file for complete search history.

(56)            References Cited

U.S. PATENT DOCUMENTS 10,990,759  B1 *   4/2021  Sosonkin .............. H04L 9/3239
11,037,573  B2 *   6/2021  Arantes ................... G06F 3/167
               (Continued)

FOREIGN PATENT DOCUMENTS

CN        107493501  A  * 12/2017  ............. G10L 25/63
EP         4002364  A1 *  5/2022  ............. G10L 25/63
               (Continued)

OTHER PUBLICATIONS

Sailunaz, Kashfia, et al. "Emotion detection from text and speech: a survey." Social Network Analysis and Mining 8.1 (2018): 28. (Year: 2018).*

(Continued)

*Primary Examiner* — Paras D Shah
*Assistant Examiner* — Oluwadamilola M Ogunbiyi
(74) *Attorney, Agent, or Firm* — ARC IP Law, PC; Joseph J. Mayo

(57)            ABSTRACT

The invention relates to a computer implemented method for real-time emotion recognition from a real-time audio signal. The method includes transcribing, into text, an audio speech signal contained in the audio signal by an automatic speech recognition model, and computing, by a speech representation model, a joint representation vector corresponding to a joint representation of the speech as a function of the speech signal and the text. The method also include computing, by an emotion prediction model, an emotion embedding vector (Continued)

as a function of the joint representation vector, and mapping the emotion in at least one emotional frame, according to the emotion embedding vector, by an emotion mapping model. The invention further relates to a computer program and a device implementing such a method.

9 Claims, 3 Drawing Sheets

(51) Int. Cl.
*G10L 15/22* (2006.01)
*G10L 25/63* (2013.01)

(56) References Cited

U.S. PATENT DOCUMENTS

| | | | | |
|---|---|---|---|---|
| 11,854,575 | B1 * | 12/2023 | Pinkus | G10L 25/63 |
| 2012/0089396 | A1 * | 4/2012 | Patel | G10L 25/00 704/E15.005 |
| 2013/0054244 | A1 * | 2/2013 | Bao | G10L 13/02 704/260 |
| 2014/0337257 | A1 * | 11/2014 | Chatterjee | G06N 20/00 706/12 |
| 2015/0302866 | A1 * | 10/2015 | Sobol Shikler | G06Q 10/10 704/270 |
| 2016/0063993 | A1 * | 3/2016 | Dolan | G06N 20/00 704/254 |
| 2016/0086088 | A1 * | 3/2016 | Yehezkel | G06N 20/00 706/11 |
| 2016/0372116 | A1 * | 12/2016 | Summerfield | G10L 15/063 |
| 2017/0011029 | A1 * | 1/2017 | Chatterjee | G06N 5/027 |
| 2018/0160959 | A1 * | 6/2018 | Wilde | G06N 20/00 |
| 2018/0260860 | A1 * | 9/2018 | Devanathan | G06F 16/353 |
| 2019/0033957 | A1 * | 1/2019 | Shionozaki | G06F 16/00 |
| 2019/0172243 | A1 * | 6/2019 | Mishra | G10L 15/005 |
| 2019/0188261 | A1 * | 6/2019 | Herzig | G06F 40/30 |
| 2019/0206387 | A1 * | 7/2019 | Kinoshita | G06F 40/279 |
| 2019/0228552 | A1 * | 7/2019 | Lee | G06F 40/279 |
| 2019/0384466 | A1 * | 12/2019 | Lu | G06F 40/169 |
| 2020/0075039 | A1 * | 3/2020 | Eleftheriou | G06V 40/20 |
| 2020/0302927 | A1 * | 9/2020 | Andruszkiewicz | G06F 40/216 |
| 2020/0405213 | A1 * | 12/2020 | Chappell, III | A63F 13/352 |
| 2021/0015417 | A1 * | 1/2021 | Harper | G10L 25/63 |
| 2021/0050033 | A1 | 2/2021 | Bui et al. | |
| 2021/0074261 | A1 * | 3/2021 | Yang | G10L 13/033 |
| 2021/0090551 | A1 * | 3/2021 | Jang | G10L 13/08 |
| 2021/0104245 | A1 * | 4/2021 | Aguilar Alas | G10L 15/16 |
| 2021/0110895 | A1 * | 4/2021 | Shriberg | G16H 10/20 |
| 2021/0118323 | A1 * | 4/2021 | Quy | G16H 40/67 |
| 2021/0144251 | A1 * | 5/2021 | Chen | H04M 3/5166 |
| 2021/0149995 | A1 * | 5/2021 | Misra | G06N 5/025 |
| 2021/0343280 | A1 * | 11/2021 | Zhou | G10L 15/063 |
| 2022/0020482 | A1 * | 1/2022 | Sreenivasan | G06F 3/011 |
| 2022/0245354 | A1 * | 8/2022 | Mackay | G10L 25/63 |
| 2023/0045930 | A1 * | 2/2023 | Can | G10L 15/08 |
| 2023/0115538 | A1 * | 4/2023 | Hoscilowicz | G10L 15/08 704/231 |

FOREIGN PATENT DOCUMENTS

| | | | | |
|---|---|---|---|---|
| KR | | 20190085882 | A * | 7/2019 |
| KR | | 102594081 | B1 * | 10/2023 |

OTHER PUBLICATIONS

Kumari, Rina, et al. "Misinformation detection using multitask learning with mutual learning for novelty detection and emotion recognition." Information Processing & Management 58.5 (2021): 102631. (Year: 2021).*

Cibau, Neri E., Enrique M. Albornoz, and Hugo L. Rufiner. "Speech emotion recognition using a deep autoencoder." Anales de la XV Reunion de Procesamiento de la Informacion y Control 16 (2013): 934-939. (Year: 2013).*

Deng, Jun, et al. "Semisupervised autoencoders for speech emotion recognition." IEEE/ACM Transactions on Audio, Speech, and Language Processing 26.1 (2017): 31-43. (Year: 2017).*

Phan, Duc-Anh, Yuji Matsumoto, and Hiroyuki Shindo. "Autoencoder for semisupervised multiple emotion detection of conversation transcripts." IEEE Transactions on Affective Computing 12.3 (2018): 682-691. (Year: 2018).*

Zhang, Chenghao, and Lei Xue. "Autoencoder with emotion embedding for speech emotion recognition." IEEE access 9 (2021): 51231-51241. (Year: 2021).*

European Search Report issued in EP21306787, dated May 31, 2022 (3 pages).

Kim Eesung, et al., "Affective Latent Representation of Acoustic and Lexical Features for Emotion Recognition", Sensors, vol. 20, No. 9, May 4, 2020.

Marchi, et al., "Deep Recurrent Neural Network-Based Autoencoders for Acoustic Novelty Detection", Computational Intelligence and Neuroscience, vol. 2017, Jan. 1, 2017.

Sundararajan Srinivasan, et al., "Representation learning through cross-model conditional teacher-student training for speech emotion recognition", arxiv.org, Cornell University Library, Nov. 30, 2021.

Graves, Alex, and Navdeep Jaitly. "Towards end-to-end speech recogni-on with recurrent neural networks.", international conference on 15 machine learning. PMLR, 2014.

Evain, Solène, et al. "Task Agnos-c and Task Specific Self25 Supervised Learning from Speech with LeBenchmark." Thirty-fifth Conference on Neural Informa-on Processing Systems Datasets and Benchmarks Track (Round 2). 2021.

Trigeorgis, George, et al. "Adieu features? end5 to-end speech emo-on recognition using a deep convolutional recurrent network." 2016 IEEE international conference on acoustic, speech and signal processing (ICASSP). IEEE, 2016.

Zhu, Zhi, and Yoshinao Sato "Reconciliation of Multiple Corpora for Speech Emo-on Recognition by Multiple Classifiers with an Adversarial Corpus Discriminator." Interspeech. 2020.

Zhang, Yue, et al. "Multi-task deep neural network with shared hidden layers: Breaking down the wall between 20 emo-on representations." 2017 IEEE international conference on acoustic, speech and signal processing (ICASSP). IEEE, 2017.

Rudovic, Ognjen, et al. "Personalized machine learning for robot perception of affect and engagement in autism therapy." Science Robo-cs 3.19 (2018).

Hu, Yanxin, et al. "DCCRN: Deep complex convolution recurrent 35 network for phase-aware speech enhancement." arXiv preprint—7—arXiv:2008.00264 (2020).

Yin, Shi, et al. "Noisy training for deep neural networks in speech recognition." 5 EURASIP Journal on Audio, Speech, and Music Processing 2015.1 (2015): 1-14.

Devlin, Jacob, et al. "Bert: Pre-training of deep bidirectional transformers for language (2019) understanding.".

Siriwardhana, Shamane, et al. "Jointly Fine-Tuning" BERT-like Self Supervised Models to Improve Mul-modal Speech Emo-on Recognition. (2020).

Ekman, Paul. "An argument for basic emotions." Cognition & emo-on 6.3-4 (1992):169-200.

Russell, James A. "A circumplex model of affect." Journal of personality and social psychology 39.6 (1980): 1161.

Eyben, Florian, et al. "Real-life voice activity detection with LSTM recurrent neural networks and an application to Hollywood movies." 2013 IEEE International Conference on Acoustics, Speech and Signal Processing. IEEE, 2013.

* cited by examiner

METHOD, DEVICE AND COMPUTER PROGRAM FOR EMOTION RECOGNITION FROM A REAL-TIME AUDIO SIGNAL

BACKGROUND OF THE INVENTION

Field of the Invention

Embodiments of the invention relate to a computer implemented method for emotion recognition from a real-time audio signal. The invention also relates to a computer program, and a device configured, to carry out such a method.

The field of the invention is the field of digital solutions for emotion recognition from audio signals.

Description of the Related Art

Human Computer Interaction (HCI), which focuses on the interfaces between people and computers, is today mainly based on touch based graphical interfaces. However, since speech is the most natural way of interaction among humans, using speech as the primary mode of interaction has recently become more popular. Most current speech-based human-computer interaction applications today such as Apple's Siri or Amazon's Alexa are only focused on recognizing spoken words. However, non-verbal communication such as emotion plays an important role when communicating with humans.

There are known several computer implemented methods for emotion recognition from audio signals. These methods mostly rely on data-driven techniques to detect either different emotion categories such as happiness and sadness, or different emotion dimensions such as arousal and valence. Thus, known techniques carry out a partial emotion recognition based on part of the information pertaining to emotion and give a partial representation of said emotion.

Moreover, although known techniques can be successful, mainly under controlled environments, they do not work well in real life conditions, especially when emotion changes or new data is to be considered in order to recognize emotion.

A purpose of at least one embodiment of the invention is to overcome at least one of these drawbacks.

Another purpose of at least one embodiment of the invention is to provide a more efficient solution for emotion recognition, in particular in real life conditions.

Another purpose of at least one embodiment of the invention is to provide a more evolutionary solution for emotion recognition.

BRIEF SUMMARY OF THE INVENTION

One or more embodiments of the invention makes it possible to achieve at least one of these aims by a computer implemented method for emotion recognition from a real-time audio signal, said method comprising several iterations of an emotion detection phase comprising the following steps:

transcription, into a text, an audio speech signal contained is said audio signal by an automatic speech recognition model;

computing, by a speech representation model, a joint representation vector as a function of said speech signal and said text;

computing, by an emotion prediction model, an emotion embedding vector as a function of said joint representation vector; and mapping said emotion in at least one emotional frame, according to said emotion embedding vector, by an emotion mapping model.

At least one embodiment of the invention proposes recognition of an emotion in a real-time audio signal according to a joint representation vector of the speech, said joint representation vector depending on both the speech signal, i.e. the audio signal of the speech, and the text of the speech, i.e. the textual content of speech. Thus, at least one embodiment of the invention carries out a more comprehensive and complete recognition of the emotion of the person whom the speech utterance originates from. In other words, at least one embodiment of the invention considers both the characteristics of the audio signal representing the speech utterance and the textual information of the speech utterance for recognizing the emotion conveyed with speech. Thus at least one embodiment of the invention makes it possible a more efficient recognition of emotion, in particular in real life conditions.

Plus, at least one embodiment of the invention proposes computing an emotion embedding vector, before representing the emotion in at least one emotional frame. The emotion embedding vector is a data that is not in the form of an emotion representation defined or understood by humans, yet. Such a data can then be used to map the emotion according to one or several emotional frame, as desired. Thus, at least one embodiment of the invention allows a more complete and customizable representation of emotion.

The automatic speech recognition model, ASR, may be any ASR model. For example, the ASR model may be the model described in the paper from Graves, Alex, and Navdeep Jaitly. "*Towards end-to-end speech recognition with recurrent neural networks.*", international conference on machine learning. PMLR, 2014.

The ASR model transcribes audio speech into text.

Since, ASR modules are well known in the literature, a detailed description of the ASR model will not be given here for sake of brevity. Plus, one or more embodiments of the invention is not limited to a specific ASR model or to a specific technique to perform ASR.

The speech representation model, SRM, may be a pretrained artificial neural network (ANN). For example, the SRM may be the model described in the paper Evain, Solène, et al. "*Task Agnostic and Task Specific Self-Supervised Learning from Speech with LeBenchmark.*" Thirty-fifth Conference on Neural Information Processing Systems Datasets and Benchmarks Track (Round 2). 2021.

The speech representation model provides a joint representation vector, that may be an n-dimensional list of numerical values.

Since speech data representation models are well known in the art, a detailed description of the speech data representation model will not be given here for sake of brevity. Plus, one or more embodiments of the invention is not limited to a specific SRM or to a specific technique to perform speech representation.

The emotion prediction model, EPM, may be a pretrained artificial neural network (ANN) that predicts specific emotion annotations from registered speech utterances. For example, the EPM may be the model described in the paper form Trigeorgis, George, et al. "*Adieu features? end-to-end speech emotion recognition using a deep convolutional*

*recurrent network.*" 2016 IEEE international conference on acoustics, speech and signal processing (ICASSP). IEEE, 2016.

The emotion prediction model may also be a combination of a shared neural network model to predict a notion of emotion, which we call "emotion embedding" here, and separate models to map the so called emotion embedding to each representation of emotion, similar to Zhu, Zhi, and Yoshinao Sato. "*Reconciliation of Multiple Corpora for Speech Emotion Recognition by Multiple Classifiers with an Adversarial Corpus Discriminator.*" INTERSPEECH. 2020. The training of both the shared model and specific models can be done either in separate steps or at the same time following a multi-task learning strategy, where in each epoch of training the neural networks, at least one embodiment includes training the shared model and the specific model of each task for all the considered tasks, similar to Zhang, Yue, et al. "*Multi-task deep neural network with shared hidden layers: Breaking down the wall between emotion representations.*" 2017 IEEE international conference on acoustics, speech and signal processing (ICASSP). IEEE, 2017. At least one embodiment may include simply different datasets of emotion or different representations of emotion if two different datasets has considered the same annotation strategy of emotion.

The emotion embedding vector may be an n-dimensional list of numerical values.

Since emotion prediction models are well known in the literature, a detailed description of the emotion prediction model will not be given here for sake of brevity. Plus, one or more embodiments of the invention is not limited to a specific EPM or to a specific technique to perform emotion prediction.

In one or more embodiments, the method according to the invention may further comprise a novelty detection step for detecting novel expression(s) of emotion in the speech, by a novelty detection model, according to the joint representation vector.

By "novel expression of emotion" it is meant a novel emotional expression, whether the emotion itself is novel or just the way it is expressed, which has not been seen by the emotion prediction model. The novel expression of emotion is detected according to the joint representation vector.

This novelty detection step may have different implications at different scales, from adapting to a specific person or a specific culture. This can mean making the models better at an individual level by adapting to how specifically an individual expresses emotion or more broadly, how a certain set of people (e.g., culturally) express certain emotions.

The novelty detection model may be an artificial neural network (ANN) trained to rebuild the input in its output (I.e., an autoencoder) similar to Marchi, Erik, et al. "*Deep recurrent neural network-based autoencoders for acoustic novelty detection.*" Computational intelligence and neuroscience (2017). This way, when the model outputs a signal different from its input (indicated by an arbitrary threshold), it signifies that the input signal was more different than a certain threshold to the other existing signals already used to train the novelty detection model, which means that the data is novel for the existing model.

In one or more embodiments, the method according to the invention may further comprise a step for training the emotion prediction model in case of novelty detection in the speech.

This training may simply be retraining the emotion prediction model with the previous existing data plus data detected as novel by the novelty detection model or just fine-tuning the model (i.e., training the model further) using only the novel data.

Such a training allows adapting the emotion prediction model to novel data. For example, this way the prediction model may be personalized by adapting each model to each person by adding an extra layer to the model and training that layer using only samples from a specific person. This can be similar to the idea described in the paper from Rudovic, Ognjen, et al. "*Personalized machine learning for robot perception of affect and engagement in autism therapy.*" Science Robotics 3.19 (2018).

In one or more embodiments, the method according to the invention may further comprise a step for detecting voice activity in the real-time audio signal, the detection phase being carried out when a voice activity is detected.

Indeed, if no speech is detected in the audio signal, the emotion detection phase is not carried out, thus saving computing time and resources.

The voice activity detection may be carried out by Voice Activity Detection (VAD) Module. The VAD module may constantly monitor, for example in a loop, the input Audio Signal and detect a speech utterance once a person has spoken.

The VAD module may be a neural network trained for detection voice activity in an audio signal, i.e. for detecting the voice of a person in an audio signal. This is usually achieved by framing the audio signal into small chunks (each can be 100 ms as an example) and then assigning each chunk a +1 if there is voice and −1 if there is no speech. This way the neural network can be trained to predict voice activity from an audio signal.

Since the VAD modules are well known in the literature, a detailed description of the VAD module will not be given here for sake of brevity. Plus, one or more embodiments of the invention is not limited to a specific VAD, or to a specific technique for detecting voice activity.

In one or more embodiments, the method according to the invention may further comprise a step for extracting a speech signal from the audio signal, the detection phase being carried out for said speech signal.

Indeed, the audio signal may comprise an audio signal representing the speech of the person of interest, but also parasitic audio signals originating from other sources located in the environment of the said person of interest such as other persons, machines, cars, etc. Thus, the extraction of speech signal of the person of interest from the acquired real-time audio signal makes it possible to reduce, or even to eliminate, these parasitic audio signals, making the method according to one or more embodiments of the invention more accurate.

The extraction of the speech from the audio signal may be carried out through different means such as a speech enhancement module, where embodiments may include training a neural network to predict clean audio signals from the noisy ones similar to Hu, Yanxin, et al. "*DCCRN: Deep complex convolution recurrent network for phase-aware speech enhancement.*" arXiv preprint arXiv:2008.00264 (2020), or by training the speech representation model on noisy audio signals, in which one or more embodiments train a neural network to be robust against noise by training it on the noisy signals in the first place, similar to Yin, Shi, et al. "*Noisy training for deep neural networks in speech recognition.*" EURASIP Journal on Audio, Speech, and Music Processing 2015.1 (2015): 1-14.

The method according to one or more embodiments of the invention may further comprise a step for computing, by a speech embedding model, a speech embedding vector as a function of the audio speech signal, said speech embedding vector being used as input data for computing the joint representation vector.

The speech embedding vector may include an n dimensional list of numerical values.

The speech embedding model may be any known pre-trained Self-Supervised Learning (SSL) algorithm, and in particular a pretrained Artificial Neural Network.

Since speech embedding models are well known, a detailed description of the speech embedding model will not be given here for sake of brevity. Plus, one or more embodiments of the invention is not limited to a specific speech embedding model, or to a specific technique for speech embedding.

The method according to one or more embodiments of the invention may comprise a step of computing, by a textual embedding model, a textual embedding vector as a function of the text obtained at the transcription step, said text embedding vector being used as input data for computing the joint representation vector.

The textual embedding vector may be an n dimensional list of numerical values.

The textual embedding model may be any known pre-trained Self-Supervised Learning (SSL) algorithm. For example, the textual embedding model may be the BERT model. Detailed information regarding the BERT model may be found in the paper from Devlin, Jacob, et al. *"Bert: Pre-training of deep bidirectional transformers for language understanding."*

Since textual embedding models are well known by a person having ordinary skills in the art, a detailed description of the textual embedding model will not be given here for sake of brevity. Moreover, at least one embodiment of the invention is not limited to a specific textual embedding model, or to a specific technique for textual embedding.

The joint representation model provides a joint representation vector that may be an n-dimensional list of numerical values.

The joint representation model can be as simple as concatenating the embeddings obtained by speech and textual embedding models but also more complex as jointly learning or fine-tuning both the aforementioned models, where one or more embodiments train the self-supervised models for both speech and text at the same time, similar to Siriwardhana, Shamane, et al. *"Jointly Fine-Tuning "BERT-like" Self Supervised Models to Improve Multimodal Speech Emotion Recognition."*

In one or more embodiments of the method according to the invention, the mapping step may comprise a step for classifying the emotion in one class among several emotion classes, by a categorical mapping model. The categorical mapping may be based on Ekman's psychological model of affect described in Ekman, Paul. *"An argument for basic emotions."* Cognition & emotion 6.3-4 (1992): 169-200.

The categorical mapping model may be any known pre-trained Self-Supervised Learning (SSL) algorithm, and in particular a pretrained Artificial Neural Network.

In one or more embodiments, the emotion may be classed in one of the following classes: happy, sad, nervous, angry, neutral, etc.

For example, the categorical mapping model may take as input data the emotion embedding vector and output a class of the emotion among several classes previously defined. Moreover, at least one embodiment of the invention is not limited to a specific categorical mapping model, or to a specific technique for categorical mapping.

In one or more embodiments of the method according to the invention, the mapping step may comprise a step for locating the emotion in a coordinate system comprising several dimensions, each dimension corresponding to an emotional dimension, by a dimensional mapping model. The dimensional representation of emotion may be based on Russell's circumplex model of affect described in Russell, James A. *"A circumplex model of affect."* Journal of personality and social psychology 39.6 (1980): 1161.

In one or more embodiments, at least one emotional dimension may be chosen among the following emotion:

arousal, valence, etc.

For example, the coordinate system may comprise only two dimensions: a first dimension or axis corresponding to Arousal, and a second dimension or axis corresponding to Valence. The emotion may be located in this two dimensional system with a coordinate having two values, one for Arousal and one for Valence.

The dimensional mapping model may be any known pretrained Self-Supervised Learning (SSL) algorithm, and in particular a pretrained Artificial Neural Network.

For example, the dimensional mapping model may take as input data the emotion embedding vector and outputs a coordinate of the emotion in the predefined coordinate system. Moreover, at least one embodiment of the invention is not limited to a specific dimensional mapping model, or to a specific technique for dimensional mapping.

According to one or more embodiments of the invention, it is proposed a computer program comprising instructions, which when executed by a computer, cause the computer to carry out the steps of the method according to at least one embodiment of the invention.

The computer program may be in any programming language such as C, C++, JAVA, Python, etc.

The computer program may be in machine language.

The computer program may be stored, in a non-transient memory, such as a USB stick, a flash memory, a hard-disc, a processor, a programmable electronic chop, etc.

The computer program may be stored in a computerized device such as a Smartphone, a tablet, a computer, a server, etc.

According to at least one embodiment of the invention, it is proposed a device configured to carry out the steps of the method according to one or more embodiments of the invention.

The device may be a personal device such as a Smartphone, a tablet, a Smartwatch, a computer, any wearable electronic device, etc.

The device according to one or more embodiments of the invention may execute one or several applications to carry out the method according to at least one embodiment of the invention.

The device according to one or more embodiments of the invention may be loaded with, and configured to execute, the computer program according to at least one embodiment of the invention.

BRIEF DESCRIPTION OF THE DRAWINGS

Other advantages and characteristics will become apparent on examination of the detailed description of one or more embodiments which is in no way limitative, and the attached figures, where.

DETAILED DESCRIPTION OF THE INVENTION

It is well understood that the one or more embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the invention with respect to the prior art.

In the FIGURES, elements common to several figures retain the same reference.

Figure 1:
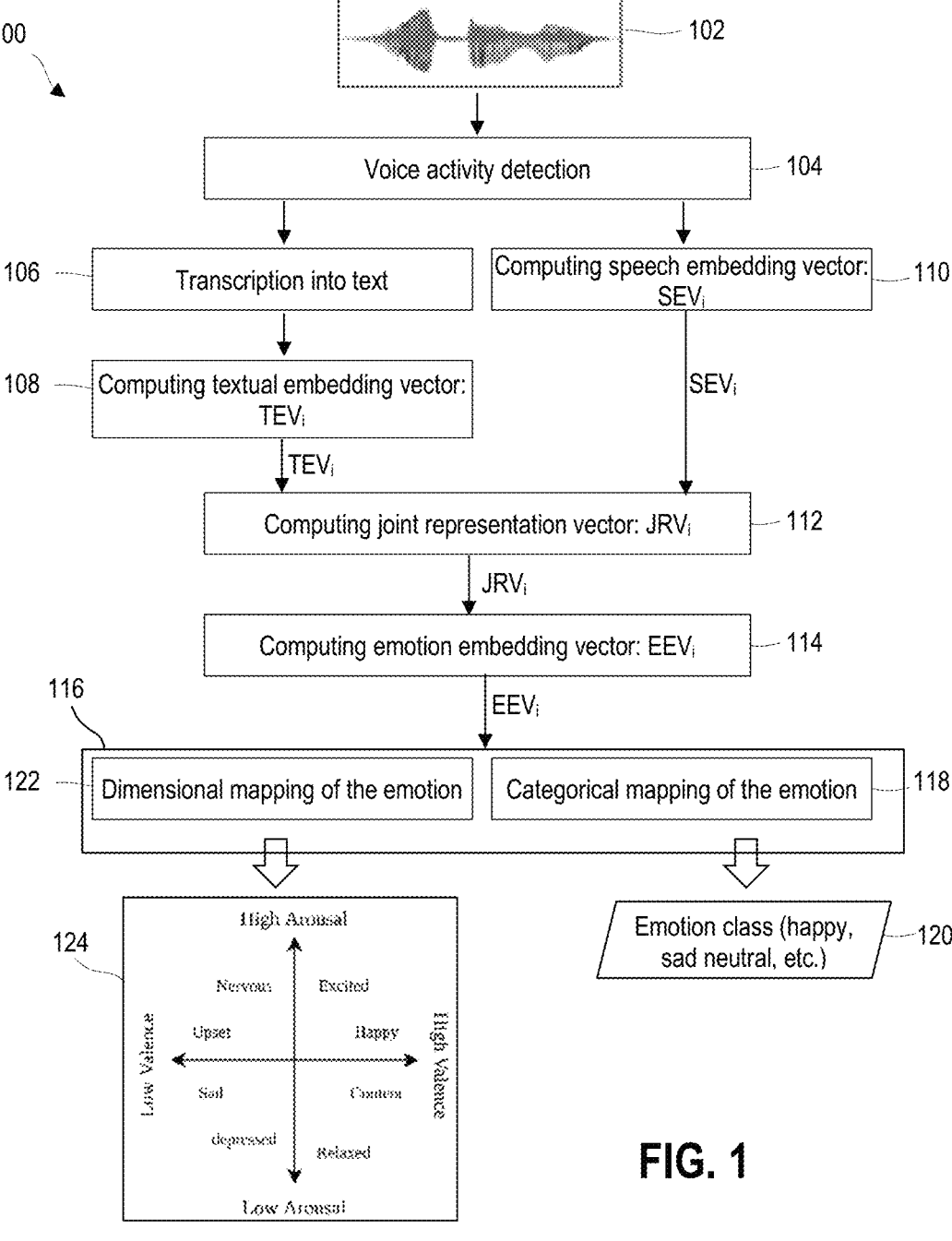
FIG. 1 is a diagrammatic representation of a first non-limitative example of a method according to one or more embodiments of the invention.

FIG. 1 is a diagrammatic representation of a first non-limitative example of a method according to the one or more embodiments of the invention for recognizing an emotion of a person from a real-time audio signal.

The method 100, shown in FIG. 1, in at least one embodiment, may be used for example for detecting the emotion of a person of interest, POI, during a telephone conversation, or a POI whom voice is detected for example by a surveillance apparatus such as a camera or a microphone, etc.

At least one of the steps of the method may be executed locally or on a server distant form the person of interest. Al least one of the steps of the method may be executed locally or on a server distant form the location where the audio signal 102 is collected.

The method 100, in at least one embodiment, comprises a step 104 detecting voice activity in an audio signal. This step 104 triggers the execution of the other steps of the method 100 whenever a voice is detected in the audio signal. Conversely, when non voice is detected in the audio signal, the remaining steps of the method 100 are not executed.

The voice activity detection may be realized by known models such as the one used in Eyben, Florian, et al. "*Real-life voice activity detection with lstm recurrent neural networks and an application to hollywood movies.*" 2013 IEEE International Conference on Acoustics, Speech and Signal Processing. IEEE, 2013.

When voice activity is detected, the voice signal is extracted from the audio signal. The remaining steps of the method 100 are carried out on the voice signal extracted from the audio signal, upon detection of voice activity.

The method 100, in at least one embodiment, comprises a step 106 transcribing into text the speech in the voice signal. The transcription into text of the speech signal may be carried out according to any known ASR model, such as the model described in the paper from Graves, Alex, and Navdeep Jaitly. "*Towards end-to-end speech recognition*

*with recurrent neural networks.*", international conference on machine learning. PMLR, 2014, without being limited to this model.

Step 106 outputs the text of the speech contained in the voice signal.

The method 100, in at least one embodiment, comprises a step 108 computing a textual embedding vector as a function of the text provided by the step 106.

The computing of the textual embedding vector may be carried out by any textual embedding model, such as a pretrained Self-Supervised Learning (SSL) algorithm, such as a pre-trained Neural Network. For example, the textual embedding model may be the BERT model.

Step 106 outputs a textual embedding vector $TEV_i$ that is an n dimensional list of numerical values.

The method 100, in at least one embodiment, comprises a step 110 computing a speech embedding vector as a function of the speech signal, i.e. the audio signal representing the speech, detected and extracted in step 104.

The computing of the speech embedding vector may be carried out by any speech embedding model, such as a pretrained Self-Supervised Learning (SSL) algorithm, such as a pre-trained artificial neural network.

Step 110 outputs a speech embedding vector, noted SEV that is an n dimensional list of numerical values The method 100, in at least one embodiment, comprises a step 112 computing a joint representation vector of the speech as a function of the speech embedding vector $SEV_i$ and the textual embedding vector $TEV_i$.

The computing of the joint representation vector may be carried out by any pretrained artificial neural network (ANN). For example, the speech representation model may be the model described in the paper form Siriwardhana, Shamane, et al. "*Jointly Fine-Tuning "BERT-like" Self Supervised Models to Improve Multimodal Speech Emotion Recognition.*"

Step 112 outputs a joint representation vector, noted $JRV_i$, that is an n dimensional list of numerical values.

The method 100, in at least one embodiment, may then comprise a step 114 for computing, by an emotion prediction model, an emotion embedding vector, noted $EEV_i$, as a function of the joint representation vector $JRV_i$.

The emotion prediction model may be a pretrained artificial neural network (ANN), which can be a model trained to predict specific annotations of emotion from speech signals similar to the model described in the paper form Trigeorgis, George, et al. "*Adieu features? end-to-end speech emotion recognition using a deep convolutional recurrent network.*" 2016 IEEE international conference on acoustics, speech and signal processing (ICASSP). IEEE, 2016. Since we also consider predicting an emotion embedding first and then mapping to different representations of emotion. This can be achieved by considering a shared neural network model and separate models to map to each representation of emotion, similar to Zhu, Zhi, and Yoshinao Sato. "*Reconciliation of Multiple Corpora for Speech Emotion Recognition by Multiple Classifiers with an Adversarial Corpus Discriminator.*" INTERSPEECH. 2020. The training of both the shared model and specific models can be done in separate steps or jointly together at the same time following a multi-task learning strategy, where in each epoch of training the neural networks, the shared model and the specific model of each task for all the considered tasks is trained, similar to Zhang, Yue, et al. "*Multi-task deep neural network with shared hidden layers: Breaking down the wall between emotion representations.*" 2017 IEEE international conference on acoustics, speech and signal processing (ICASSP). IEEE, 2017. The task in one or more embodiments can be simply different datasets of emotion or different representations of emotion if two different datasets has considered the same annotation strategy of emotion.

The emotion embedding vector $EEV_i$ is an n dimensional list of numerical values.

The method 100, in at least one embodiment, also comprises a step 116 for mapping the emotion in at least one emotional frame, as a function of the emotion embedding vector $EEV_i$.

More particularly, step 116 may comprise a step 118 for classifying the emotion in one class among several emotion classes, by a categorical mapping model.

The categorical mapping model may be any known pretrained Self-Supervised Learning (SSL) algorithm, and in particular a pretrained Artificial Neural Network (ANN).

For example, the emotion may be classed in one of the following classes: happy, sad, nervous, angry, neutral, etc.

The step 118 outputs a class 120 of the emotion.

Alternatively, or in addition, step 116 may comprise a step 122 for locating the emotion in a coordinate system 124 comprising several dimensions, each dimension corresponding to an emotional dimension, by a dimensional mapping model.

In the example shown, the coordinate system comprises a first dimension corresponding to Valence and a second dimension corresponding to Arousal.

The dimensional mapping model may be any known pretrained Self-Supervised Learning (SSL) algorithm, and in particular a pretrained Artificial Neural Network.

It is noted that steps 104-116 may be reiterated continuously, or at a given frequency, in order to recognize emotion, or to refresh previously detected emotion, in the real-time audio signal 102.

Figure 2:
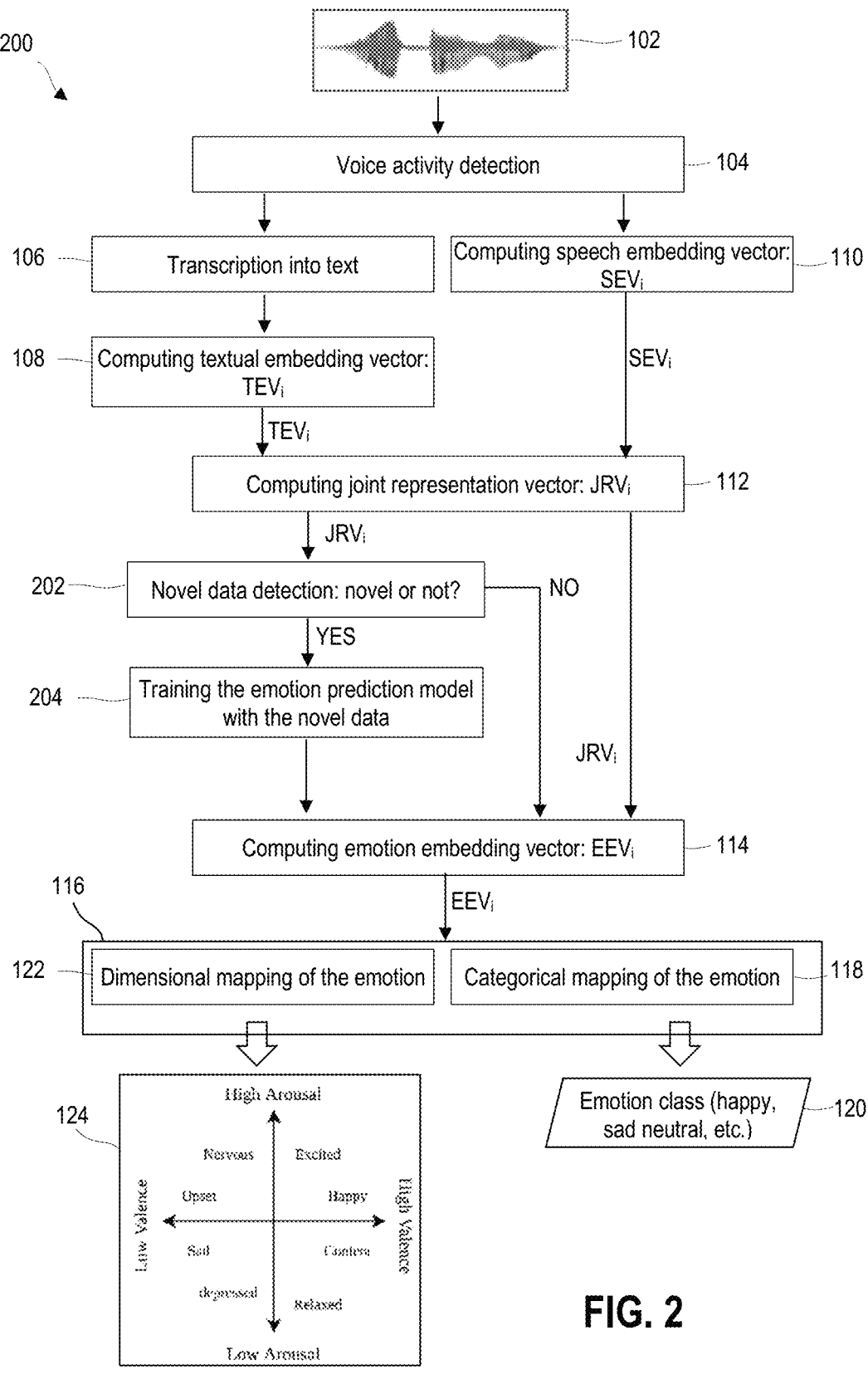
FIG. 2 is a diagrammatic representation of a first non-limitative example of a method according to one or more embodiments of the invention.

FIG. 2 is a diagrammatic representation of a second non-limitative example of a method according to one or more embodiments of the invention for recognizing an emotion of a person from a real-time audio signal.

The method 200, shown in FIG. 2, in at least one embodiment, may be used for example for detecting the emotion of a person of interest, POI, during a telephone conversation, or a POI whom voice is detected for example by a surveillance apparatus such as a camera or a microphone, etc.

The method 200, in at least one embodiment, comprises all the steps of the method 100 of FIG. 1.

The method 200, in at least one embodiment, further comprises a step 202, carried out after the joint representation vector computing step 112, for detecting, by a novelty detection model, novel data in the speech.

The novelty detection may be carried out as a function of the joint representation vector $JRV_i$ computed in step 112.

The novelty detection model may be an artificial neural network (ANN) pretrained to detect novelty. More particularly, the novelty detection model may be an artificial neural network (ANN) trained to rebuild the input in its output, i.e., an autoencoder, for example similar to Marchi, Erik, et al. "*Deep recurrent neural network-based autoencoders for acoustic novelty detection.*" Computational intelligence and neuroscience (2017). This way, when the model outputs a signal really different from its input (indicated by an arbitrary threshold), it signifies that the input signal was more different than a certain threshold to the other existing signal, which means that the data is novel.

When no novel data is detected at step 202, method 200 is continued with step 114 as described above with reference to FIG. 1.

When novel data is detected at step 202, method 200 further comprises a step 204 is carried after step 202 for training the emotion prediction model used at step 116. The steps 202 and 204 does not have to be carried out while the model is performing in real time but rather at a later time, on the registered recordings to further improve computing emotion embedding vector in 114 for future use cases.

Such a training allows adapting the emotion prediction model to novel data, thus personalizing said model. Such a training may be carried according to the training described in the paper from Rudovic, Ognjen, et al. "*Personalized machine learning for robot perception of affect and engagement in autism therapy.*" Science Robotics 3.19 (2018).

In case of novel data, step 114 is carried out with the updated emotion production model.

Figure 3:
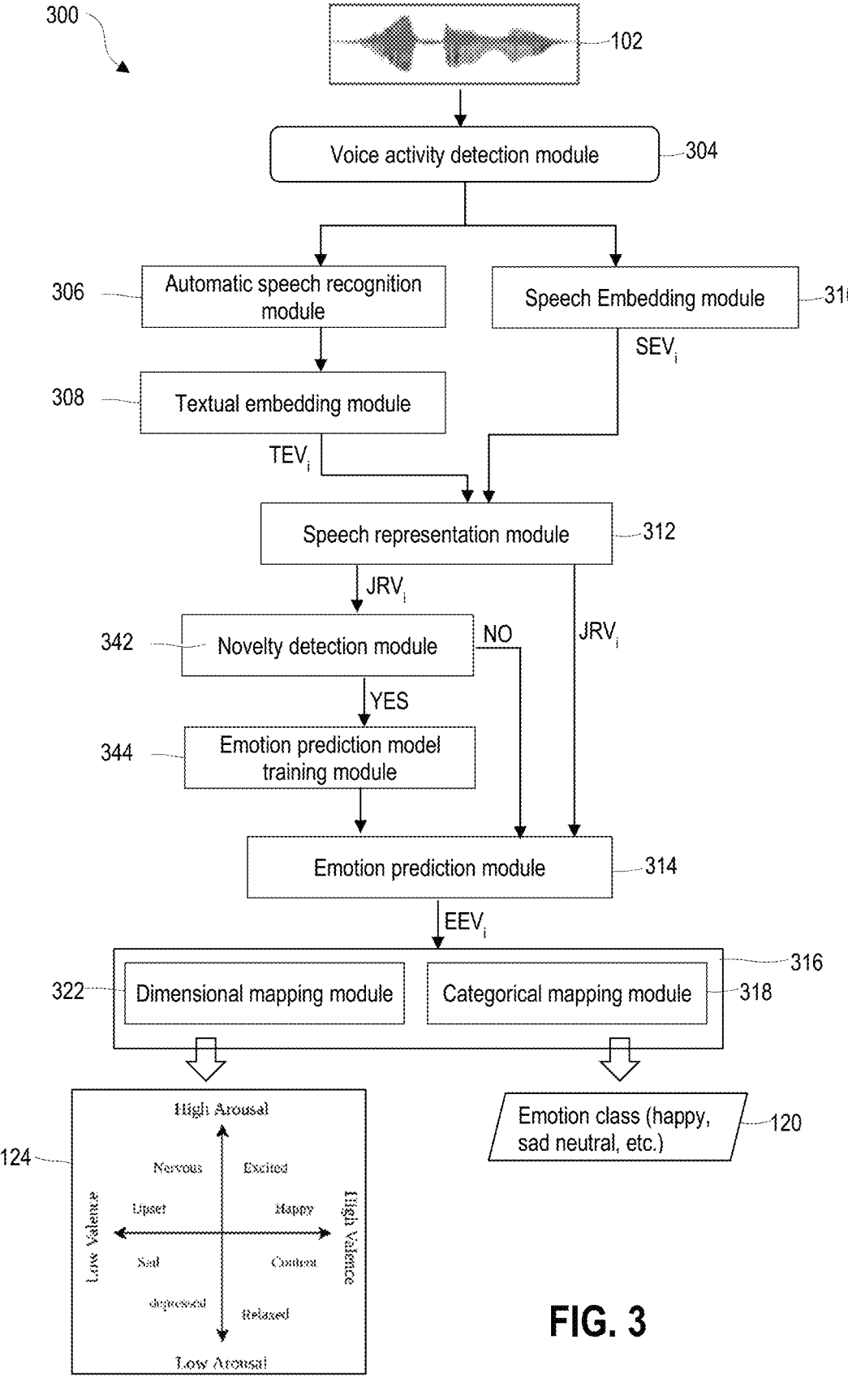
FIG. 3 is a diagrammatic representation of a non-limitative example of a device according to one or more embodiments of the invention.

FIG. 3 is a diagrammatic representation of a non-limitative example of a device according to one or more embodiment of the invention.

The device 300, shown in FIG. 3, in at least one embodiment, may be used to carry out a method for recognizing the emotion of person of interest in an audio signal, and in particular the method 100 of FIG. 1 or the method 200 of FIG. 2.

The device 300, in at least one embodiment, comprises a voice activity detection module 304 for detecting voice activity in the audio signal 102, and extraction the speech signal from the audio signal 102.

The voice activity detecting module may be, or may execute, any known model such as the one by Eyben, Florian, et al. "*Real-life voice activity detection with lstm recurrent neural networks and an application to hollywood movies.*" 2013 IEEE International Conference on Acoustics, Speech and Signal Processing. IEEE, 2013.

The device 300, in at least one embodiment, comprise an automatic speech recognition module 206 for transcribing into text the speech in the speech signal extracted by the voice activity detection module.

The module automatic speech recognition module 306 may be, or may execute, any known ASR model, such as the model described in the paper from Graves, Alex, and Navdeep Jaitly. "*Towards end-to-end speech recognition with recurrent neural networks.*", international conference on machine learning. PMLR, 2014, without being limited to this model The device 300, in at least one embodiment, comprises a textual embedding module 308 for computing a textual embedding vector as a function of the text provided by the module 306.

The textual embedding module 308 may be, or may execute, any textual embedding model, such as a pretrained Self-Supervised Learning (SSL) algorithm, such as a pretrained Neural Network. For example, the textual embedding model may be the BERT model.

The device 300, in at least one embodiment, also comprises a speech embedding module 310 for computing a speech embedding vector as a function of the speech signal detected and extracted by the voice activity detection module 304.

The speech embedding module 310 may be, or may execute, any known speech embedding model, such as a pretrained Self-Supervised Learning (SSL) algorithm, such as a pre-trained artificial neural network.

The device 300, in at least one embodiment, further comprises a speech representation module 312 for computing a joint representation vector $JRV_i$ of the speech as a function of the speech embedding vector $SEV_i$ and the textual embedding vector $TEV_i$.

The speech representation module 312 may be, or may execute out, pretrained artificial neural network (ANN). For example, the speech representation model may be the model described in the paper form Siriwardhana, Shamane, et al. *"Jointly Fine-Tuning "BERT-like" Self Supervised Models to Improve Multimodal Speech Emotion Recognition."*

The device 300, in at least one embodiment, also comprises an emotion prediction module 314 for computing an emotion embedding vector $EEV_i$, as a function of the joint representation vector $JRV_i$. The emotion prediction module 314 may be, or may execute, a pretrained artificial neural network (ANN).

The device 300, in at least one embodiment, comprises a mapping module 316 for mapping the emotion in at least one emotional frame, as a function of the emotion embedding vector $EEV_i$.

More particularly, the mapping module 316 may comprise a categorical mapping module 316 for classifying the emotion in one class among several emotion classes. This module 316 may execute a categorical mapping model, such as any known pretrained Self-Supervised Learning (SSL) algorithm, and in particular a pretrained Artificial Neural Network.

Alternatively, or in addition, the mapping module 316 may comprise a dimensional mapping module 322 for locating the emotion in a coordinate system 124 comprising several dimensions, each dimension corresponding to an emotional dimension. The dimensional mapping module 322 may be any known pretrained Self-Supervised Learning (SSL) algorithm, and in particular a pretrained Artificial Neural Network.

The device 300, in at least one embodiment, may optionally comprise a novelty detection module 342 for detecting novel data in the speech.

The novelty detection module 342 may be, or may execute, an artificial neural network (ANN) pretrained to detect novelty.

The device 300, in at least one embodiment, may comprise a training module 344 for training the emotion prediction model used in the emotion prediction module 314, with data.

Such a training module 344 may carry out a training such as the training described in the paper from Rudovic, Ognjen, et al. *"Personalized machine learning for robot perception of affect and engagement in autism therapy."* Science Robotics 3.19 (2018).

At least one of the modules described above may be local or distant form the person of interest, or form the location where the audio signal 102 is collected.

At least one of the modules may be an independent module separated from the other modules of the device 300.

At least two of the modules may be integrated into a common module.

At least one of the modules of the device 300 may be a computer program, or a software.

By way of one or more embodiments, the invention is not limited to the examples detailed above.

The invention claimed is:

1. A computer implemented method for recognizing emotion from a real-time audio signal, implemented by a device comprising one or more processors and a memory, wherein said computer implemented method includes several iterations of an emotion detection phase, and wherein said computer implemented method comprises:

receiving, by the device, an acquired real-time audio signal of a voice of a person from an apparatus comprising a microphone or a camera;

transcribing, by the device, through automatic speech recognition implementing an automatic speech recognition model, into text, an audio speech signal contained in said real-time audio signal;

computing, by the device, through speech representation implementing a speech representation model, a joint representation vector as a function of said audio speech signal and said text;

computing, by the device, through emotion prediction implementing an emotion prediction model, an emotion embedding vector, as a function of said joint representation vector;

mapping, by the device, through emotion mapping implementing an emotion mapping model, said emotion embedding vector into at least one emotion representation or at least one emotional frame, according to said emotion embedding vector, by an emotion mapping model;

outputting, by the device, said at least one emotional frame for automatic use by a human computer interactive or non-interactive system during real-time execution of the method;

detecting, by the device, through novelty detection implementing a novelty detection model, one or more novel expressions of emotion in the audio speech signal based on the joint representation vector, wherein said detecting, by the device, of said one or more novel expressions of emotion comprises processing the joint representation vector using the novelty detection model comprising an artificial neural network trained as an autoencoder to reconstruct an input comprising the joint representation vector; and determining that the audio speech signal includes a novel expression of emotion when an output reconstructed by the autoencoder differs from the joint representation vector by more than a threshold; and training, by the device, the emotion prediction model in response to detection of said one or more novel expressions of emotion in the audio speech signal, wherein said training is performed using data detected as novel by the novelty detection model.

2. The computer implemented method according to claim 1, further comprising detecting, by the device through voice activity detection, voice activity in the real-time audio signal, the emotion detection phase being carried out when voice activity is detected.

3. The computer implemented method according to claim 1, further comprising extracting, by the device, a speech signal from the real-time audio signal, wherein the emotion detection phase is carried out for said speech signal.

4. The computer implemented method according to claim 1, further comprising computing, by a speech embedding model, a speech embedding vector as a function of the audio speech signal, wherein said speech embedding vector is used as input data for computing the joint representation vector.

5. The computer implemented method according to claim 1, further comprising computing, by a textual embedding model, a textual embedding vector as a function of the text obtained during said transcribing, wherein said textual embedding vector is used as input data for computing the joint representation vector.

6. The computer implemented method according to claim 1, wherein the mapping comprises classifying the emotion in one class among several emotion classes, by a categorical mapping model.

7. The computer implemented method according to claim 1, wherein the mapping comprises locating the emotion in a coordinate system comprising several dimensions, wherein each dimension of said several dimensions corresponds to an emotional dimension, by a dimensional mapping model.

8. A non-transitory computer-readable storage medium having a computer program comprising instructions, which when executed by a computer, cause the computer to carry out a method for recognizing emotion from a real-time audio signal, wherein said method includes several iterations of an emotion detection phase, and wherein said method comprises:

receiving an acquired real-time audio signal of a voice of a person from an apparatus comprising a microphone or a camera;

transcribing, into text, an audio speech signal contained in said real-time audio signal by an automatic speech recognition model;

computing, by a speech representation model, a joint representation vector as a function of said audio speech signal and said text;

computing, by an emotion prediction model, an emotion embedding vector, as a function of said joint representation vector;

mapping said emotion in at least one emotion representation or at least one emotional frame, according to said emotion embedding vector, by an emotion mapping model; and outputting said at least one emotional frame for automatic use by a human computer interactive or non-interactive system during real-time execution of the method;

wherein the method further comprises detecting one or more novel expressions of emotion in the audio speech signal, by a novelty detection model, based on the joint representation vector, wherein said detecting, by the device, of said one or more novel expressions of emotion comprises processing the joint representation vector using the novelty detection model comprising an artificial neural network trained as an autoencoder to reconstruct an input comprising the joint representation vector, and determining that the audio speech signal includes a novel expression of emotion when an output reconstructed by the autoencoder differs from the joint representation vector by more than a threshold, and training the emotion prediction model in response to detection of said one or more novel expressions of emotion in the audio speech signal, wherein said training is performed using data detected as novel by the novelty detection model.

9. A device for real-time recognition of emotion from a real-time audio signal, said device being configured to receive an acquired real-time audio signal of a voice of a person from an apparatus comprising a microphone or a camera, said device comprising:

one or more processors and a memory, said one or more processors implementing:

an automatic speech recognition model configured to transcribe, into text, an audio speech signal contained in said real-time audio signal;

a speech representation model configured to compute a joint representation vector as a function of said audio speech signal and said text;

an emotion prediction model configured to compute an emotion embedding vector, as a function of said joint representation vector;

an emotion mapping model configured to map said emotion embedding vector into at least one emotion representation or at least one emotional frame;

wherein said device is configured to output said at least one emotional frame for automatic use by a human computer interactive or non-interactive system during real-time execution of the device; and a novelty detection model configured to detect one or more novel expressions of emotion in the audio speech signal, based on the joint representation vector, wherein said novelty detection model detects said one or more novel expressions of emotion by processing the joint representation vector using the novelty detection model comprising an artificial neural network trained as an autoencoder to reconstruct an input comprising the joint representation vector, and determining that the audio speech signal includes a novel expression of emotion when an output reconstructed by the autoencoder differs from the joint representation vector by more than a threshold, a training model configured to train said emotion prediction model in response to detection of said one or more novel expressions of emotion in the audio speech signal, wherein said training model trains said emotion prediction model using data detected as novel by the novelty detection model.

* * * * *